(12) United States Patent
Hayashimoto et al.

(10) Patent No.: US 9,308,602 B2
(45) Date of Patent: Apr. 12, 2016

(54) LASER LAP WELDING METHOD

(75) Inventors: Kazuhiro Hayashimoto, Hamamatsu (JP); Yuta Fujinuma, Hamamatsu (JP); Tsukasa Hagihara, Hamamatsu (JP); Shuichi Usui, Hamamatsu (JP); Yoshitaka Sanuki, Hamamatsu (JP); Masahiro Takahashi, Hamamatsu (JP)

(73) Assignee: Suzuki Motor Corporation (JP)

( * ) Notice: Subject to any disclaimer, the term of this patent is extended or adjusted under 35 U.S.C. 154(b) by 698 days.

(21) Appl. No.: 13/333,349

(22) Filed: Dec. 21, 2011

(65) Prior Publication Data
US 2012/0160815 A1 Jun. 28, 2012

(30) Foreign Application Priority Data

Dec. 27, 2010 (JP) ................................. 2010-290007

(51) Int. Cl.
*B23K 26/28* (2014.01)
*B23K 26/32* (2014.01)

(52) U.S. Cl.
CPC .............. *B23K 26/28* (2013.01); *B23K 26/082* (2015.10); *B23K 26/244* (2015.10); *B23K 26/32* (2013.01); *B23K 26/322* (2013.01); *B23K 2201/006* (2013.01); *B23K 2201/18* (2013.01); *B23K 2201/34* (2013.01); *B23K 2203/04* (2013.01); *B23K 2203/50* (2015.10)

(58) Field of Classification Search
CPC ... B23K 2201/26; B23K 9/0026; B23K 9/038
USPC ............ 219/54–58, 69.1, 69.11, 73.2, 73.21, 219/76.1, 76.12, 121.11–121.86
See application file for complete search history.

(56) References Cited

U.S. PATENT DOCUMENTS

| | | | | |
|---|---|---|---|---|
| 5,451,742 A | * | 9/1995 | Nishio et al. | 219/121.64 |
| 5,603,853 A | * | 2/1997 | Mombo-Caristan | 219/121.64 |
| 2006/0222457 A1 | * | 10/2006 | Becker et al. | 403/270 |

FOREIGN PATENT DOCUMENTS

| | | |
|---|---|---|
| CN | 101541469 A | 9/2009 |
| CN | 101829849 A | 9/2010 |
| DE | 19947314 A1 | 4/2001 |

(Continued)

OTHER PUBLICATIONS

Chinese Office Action for Applicaiton No. 201110457435.5 dated Jan. 10, 2014.

(Continued)

*Primary Examiner* — Tu B Hoang
*Assistant Examiner* — Thomas Ward
(74) *Attorney, Agent, or Firm* — Lerner, David, Littenberg, Krumholz & Mentlik, LLP (57) ABSTRACT

A laser lap welding method by irradiating of a laser beam from one side of a plurality of overlapped workpieces (1, 2), the method includes the steps of: scanning (La) the laser beam in the forward direction along a predetermined section of the workpieces; reversing the scanning direction of the laser beam at a terminating end (t) of the predetermined section; scanning (Lb) the laser beam in the backward direction and terminating of the irradiating of the laser beam onto the predetermined section, wherein the scanning of the laser beam in the backward direction is offset from the scanning of the laser beam in the forward direction such that a part of weld bead (12) formed by the laser scanning in the backward direction overlaps the weld bead (11) formed by the laser scan in the forward direction.

8 Claims, 4 Drawing Sheets

(56) References Cited

FOREIGN PATENT DOCUMENTS

| | | |
|---|---|---|
| DE | 102005004787 A1 | 8/2006 |
| DE | 102008062866 A1 | 5/2010 |
| JP | 2003170281 A | 6/2003 |
| JP | 2004098122 A | 4/2004 |
| JP | 2007-313544 A | 12/2007 |
| JP | 2008110390 A | 5/2008 |
| JP | 2008-264793 A | 11/2008 |

OTHER PUBLICATIONS

German Office Action for Application No. 10 2011 089 146.3 dated Apr. 19, 2013.

* cited by examiner

LASER LAP WELDING METHOD

CROSS-REFERENCE TO RELATED APPLICATIONS

The present application claims priority from Japanese Patent Application No. 2010-290007, filed in the Japanese Patent Office on Dec. 27, 2010, the disclosure of which is hereby incorporated herein by reference.

BACKGROUND OF THE INVENTION

The present invention relates to a laser lap welding method, and more particularly to a laser lap welding method which improves a hole, an indentation, and the like, which are caused at a welding terminating end.

A laser welding method, in which a laser beam is irradiated onto a workpiece to heat and melt a material of the irradiated portion by the light energy of the laser beam, has an advantage in that high speed welding can be performed in a non-contact manner, but has a problem in that a hole and an indentation are caused at a welding terminating end. Thus, the problem has become one of the factors that limit the use of the laser welding method to only some automobile parts and prevents the laser welding method from being used for into the vehicle body welding process in which strict management of performance and quality about airtightness, water leakage, and the like, is required.

Perforation and indentation, which are caused in a laser welding terminating end, are caused by molten metal supplied to the welding terminating end eventually becoming insufficient due to a phenomenon in which the molten metal flows in the direction opposite to the welding advancing direction. As a measure to solve this problem, there is known, as disclosed in JP2007-313544A, a method which is referred to as "ramping" or "fade down" and in which the laser output is controlled to be gradually reduced toward the welding terminating end.

Figure 5A:
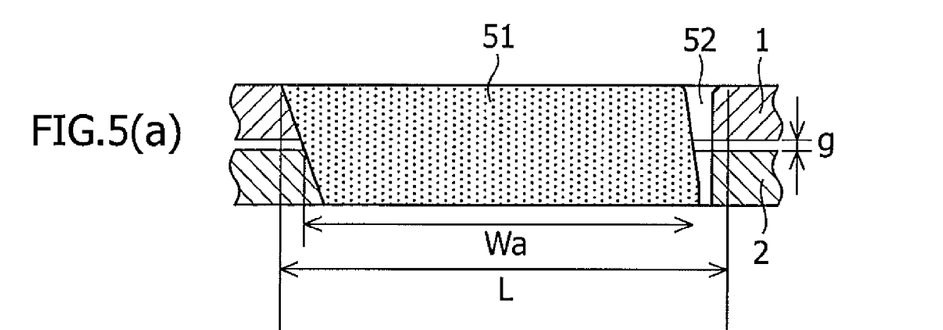
Figure 5B:
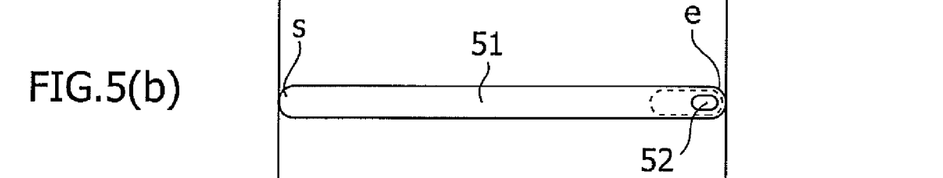

For example, as shown in FIG. 5(A) and FIG. 5(B), in the case in which two galvanized steel sheets 1 and 2 are overlapped and laser-welded to each other, when the laser output P is maintained at a constant level until the laser beam reaches the welding terminating end, a hole 52 is generated at the end of a weld bead 51, and the substantial welding length Wa becomes shorter than the laser irradiation length L by the length corresponding to the hole 52.

Figure 5C:
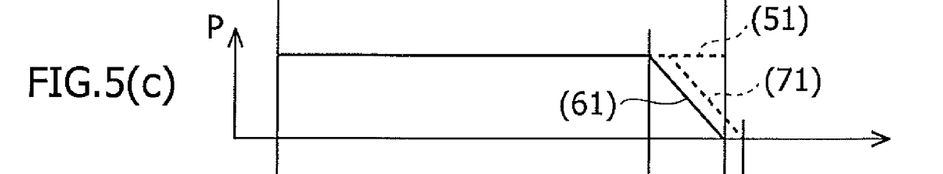
Figure 5D:
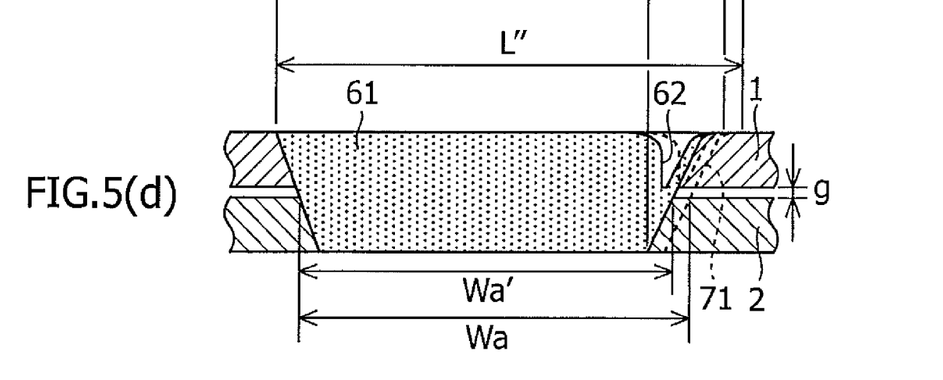

On the other hand, as shown by the solid line (61) in FIG. 5(C) and FIG. 5(D), when the laser output P is gradually reduced toward the welding terminating end, since the penetration depth is gradually reduced, the frequency of occurrence of the perforation at the end of the weld bead 61 is reduced, but the perforation cannot be completely prevented. Furthermore, even in the case in which the perforation is not caused, a comparatively deep indentation 62 is left at the welding terminating end, and also the substantial welding length Wa' is further reduced. Thus, when this welding method is used as it is, a reduction in strength, and the like, is caused at the welding terminating end, so that the welding quality is inevitably affected.

In order to avoid this problem, it is also conceivable to increase the welding length (L") as shown by a broken line (71) in FIG. 5(C) and FIG. 5(D). However, in this case, problems are caused in which a space required for the weld bead 71 and the cycle time are increased.

As another measure against the above-described problems, a method is disclosed in JP2008-264793A in which the laser irradiation diameter is increased at the welding terminating end by defocusing the laser beam. However, as shown in FIG. 1 of JP2008-264793A, when the laser beam is stopped and defocused at welding terminating end, burn-through may be caused instead of an improvement in the hole and indentation. Furthermore, although not clearly described in JP2008-264793A, there arises a problem that, when the defocusing operation is started just before the laser beam reaches the welding terminating end, the energy density of the laser beam is reduced and thereby the substantial welding length is reduced similarly to the case in which the above-described method is used.

BRIEF SUMMARY OF THE INVENTION

The present invention has been made in view of the above-described circumstances. An object of the present invention is to provide a laser lap welding method which does not need complicated control, such as laser focus control, and which can improve the hole and indentation at the welding terminating end while avoiding an increase in the space and the cycle time that are required to secure the welding length.

In order to solve the above-described problem, the present invention provides a laser lap welding method which includes irradiating a laser beam from one side of a plurality of overlapped workpieces, including the steps of: scanning (La) the laser beam in the forward direction along a predetermined section of the workpieces; reversing the scanning direction of the laser beam at a terminating end (t) of the predetermined section; briefly scanning (Lb) the laser beam in the backward direction and terminating the irradiating of the laser beam onto the predetermined section, wherein the scanning the laser beam in the backward direction is offset from the scanning the laser beam in the forward direction such that a part of a weld bead formed by the laser scanning in the backward direction overlaps the weld bead formed by the laser scan in the forward direction, and then terminating the irradiating of the laser beam onto the predetermined section.

It has already been described that the occurrence of the perforation and indentation at the welding terminating end is due to a phenomenon in which molten metal flows in the direction opposite to the welding advancing direction, that is, flows backward in the scanning direction of the laser beam. Thus, as a result of extensive research, the present inventors have found that, when the scanning direction of the laser beam is reversed at the welding terminating end (at a geometric end of a bead to be formed as a welded joint) and then the laser scan is performed in the backward direction, newly produced molten metal flows to the side of the geometric end of the weld bead, and thereby the shortage of the molten metal at the geometric end is eliminated.

In this case, when the laser beam is irradiated again onto the metal portion brought into a molten state by the laser welding, the metal in the molten state is scattered, so that burn-through, and the like, is occurred. In contrast, in order to form new molten metal, the laser scan in the backward direction needs to be performed in a non-molten portion of the workpiece. However, the laser scan in the backward direction is performed in a non-molten portion of the workpiece by offsetting the laser beam from the weld bead formed by the laser scans in the forward direction, thereby, it is possible to supply the newly molten metal toward the geometric end of the weld bead, located rear side of the laser scan in the backward direction, without a problem such as burn-through.

Furthermore, when the laser scan is performed in the backward direction so as to allow a part of weld bead formed by the laser scan in the backward direction to overlap the weld bead formed by the laser scan in the forward direction, the flow of molten metal is promoted by the wettability of molten metal not only in the rear direction with respect to the scanning direction, but also in the side direction (the overlapping direction of the beads) with respect to the scanning direction. Thereby, the beads in the forward and backward directions can be fused together, and also, it is possible to avoid the shortage of molten metal at the time when the laser scan in the backward direction is terminated at a geometric intermediate position of the weld bead.

Furthermore, since the substantial welding length to the geometric end of the weld bead is secured, it is not necessary that, as in the conventional method, the welding length be shortened in order to prevent the perforation and indentation from being formed at the welding terminating end, and that the weld bead section be extended in order to avoid the shortening of the welding length. As a result, the increase in the required space for the weld bead can be minimized. Furthermore, the complicated focus control of the laser beam is not needed, and hence the burden on the welding equipment can also be reduced.

In the method according to the present invention, it is preferred that the scanning of the laser beam (Lb) in the backward direction be performed at a higher speed than the speed of the scanning of the laser beam in the forward direction.

When the laser scan in the backward direction is performed at a high speed, the energy supplied to the laser irradiation portion per unit time is reduced, as a result of which it is possible to obtain the same effect as that in the case in which the laser output is reduced. That is, the depth of the weld penetration by the laser scan in the backward direction is reduced, and hence the shortage of metal at the welding terminating end can be more effectively improved. Furthermore, when the laser scan in the backward direction is performed at a high speed, the time required for the laser scan in the backward direction is reduced, and hence the increase in the cycle time can be avoided. In addition, it is not necessary to perform the laser output control as well as the complicated focus control of the laser beam, and hence the burden on the welding equipment is further reduced.

Furthermore, in each of the above-described cases in which the method according to the present invention is used, a further preferred bead shape can be obtained by using the fade down procedure for reducing the laser output continuously or stepwise at the time of terminating the laser scan in the backward direction.

In the method according to the present invention, when the scanning the laser beam in the forward direction includes a curve-shaped laser scanning at least at the terminating end of the predetermined section, and in which the scanning of the laser beam in the backward direction is offset to the outer side in the curvature direction of the curve-shaped laser scanning. When the laser scan in the backward direction is performed by offsetting the laser beam to the outer side in the curvature direction, the metal of the non-molten portion can be fused with the already molten bead over a wider area and also the metallic vapor is preferably discharged, so that an excellent bead shape can be stably obtained.

On the other hand, when the scanning of the laser beam in the forward direction includes a curve-shaped laser scanning at least at the terminating end of the predetermined section, and in which the scanning of the laser beam in the backward direction is offset to the inner side in the curvature direction of the curve-shaped laser scanning, the conditions for obtaining a stable bead shape become severe to some extent as compared with the form in which the laser scan in the backward direction is performed by offsetting the laser beam to the outer side in the curvature direction of the curve-shaped laser scan. However, in the form in which the laser scan in the backward direction is performed by offsetting the laser beam to the inner side in the curvature direction of the curve-shaped laser scan, the weld bead formed by the laser scan in the backward direction is extended on the inner side of the bead shape, and hence this form is advantageous in that the required space of the weld bead is not increased.

As described above, in the laser lap welding method according to the present invention, complicated control, such as the focus control of a laser beam, is not needed, and hence the burden on the welding equipment is small. Furthermore, with the laser lap welding method according to the present invention, the perforation and indentation at the welding terminating end can be improved while an increase in the space and cycle time required to secure the welding length is avoided. Thus, the laser lap welding method according to the present invention is advantageous to improve the quality of laser lap welding.

BRIEF DESCRIPTION OF THE DRAWINGS

FIG. 1 includes FIG. 1(A) which is a plan view showing a laser scan in a laser lap welding method according to a first embodiment of the present invention, FIG. 1(B) which is a plan view showing a bead shape, FIG. 1(C) which is a graph showing a relationship between the laser output and the speed, and FIG. 1(D) which is a sectional side view of the bead;

FIG. 2 includes FIG. 2(A) which is a plan view showing a laser scan in a laser lap welding method according to a second embodiment of the present invention, and FIG. 2(B) which is a plan view showing a laser scan in a laser lap welding method according to a third embodiment of the present invention;

FIG. 3 includes FIG. 3(A) which is a plan view showing a transitional bead shape in the laser lap welding according to the second embodiment of the present invention, and FIG. 3(B) which is a cross-sectional view along the line B-B in FIG. 3(A);

FIG. 4 includes FIG. 4(A) which is a plan view showing a final bead shape in the laser lap welding according to the second embodiment of the present invention, and FIG. 4(B) which is a cross-sectional view along the line B-B in FIG. 4(A); and FIG. 5 includes FIG. 5(A) which is a sectional side view showing a bead formed by a conventional laser lap welding method, FIG. 5(B) which is a plan view of the bead shape in the conventional laser lap welding method, FIG. 5(C) which is a graph showing a laser output, and FIG. 5(D) which is a sectional side view showing a bead formed by another conventional laser lap welding method.

DETAILED DESCRIPTION

Figures 1A, 1B, 1C, 1D:
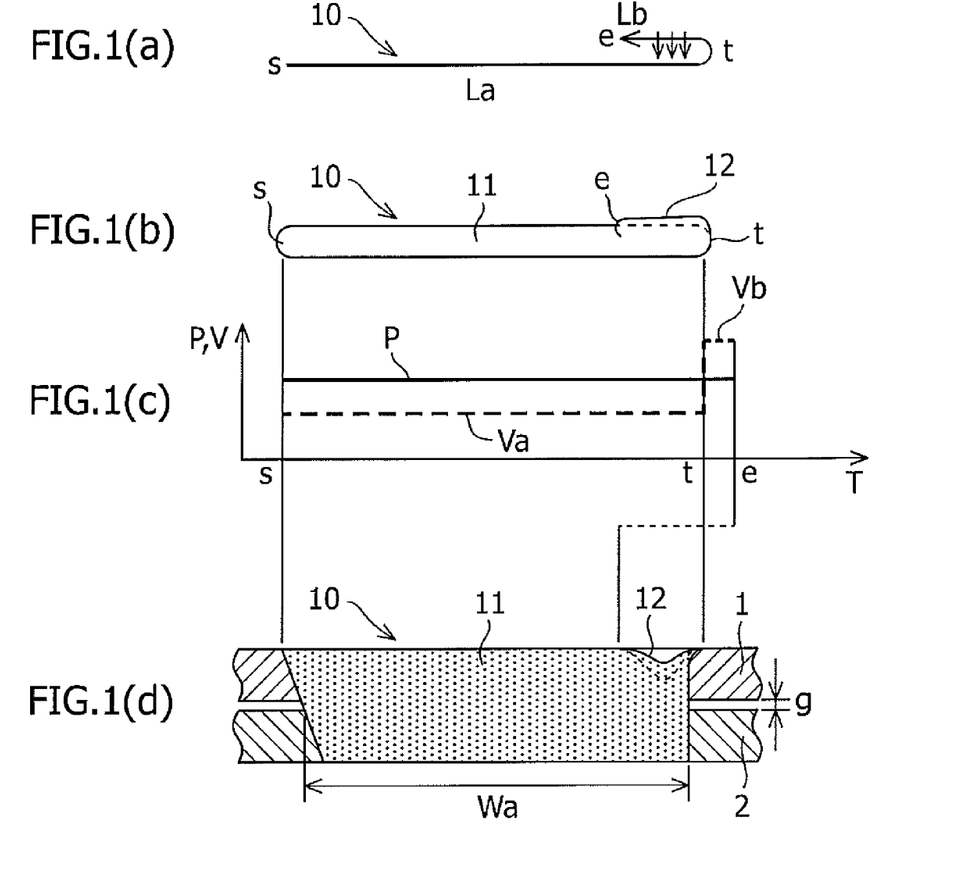

In the following, embodiments according to the present invention will be described in detail with reference to the accompanying drawings. FIG. 1 includes FIG. 1(A) which is a plan view showing laser scans La and Lb performed in laser lap welding 10 according to a first embodiment of the present invention for lap welding two steel sheets 1 and 2 (galvanized steel sheets), FIG. 1(B) which is a plan view showing a bead shape, FIG. 1(C) which is a graph showing the laser output P and the speed V, and FIG. 1(D) which is a sectional side view of the bead.

FIG. 1 shows a case in which the laser lap welding is performed so as to eventually form a weld bead (10) having a linear shape. In this case, the two steel sheets 1 and 2 are overlapped via embossments (protrusions, not shown) formed in advance on one side (or both sides) of the steel plates, and thereby the two steel sheets 1 and 2 are held with jigs (not shown), such as clamps, in the state where a tiny gap g for discharging zinc vapor is formed between the two steel sheets 1 and 2. Note that the gap g may be formed by spacers, or the like, instead of forming the embossments. Furthermore, in the case in which no galvanized layer exists on the joining surface of the two steel sheets 1 and 2, or where the two steel sheets 1 and 2 are not provided with a layer plated with a low melting point metal, such as zinc, the two steel sheets 1 and 2 may be directly overlapped without forming the gap g.

The laser lap welding 10 is performed in such a manner that a weld bead 11 penetrating the two steel sheets 1 and 2 in the thickness direction is formed by starting the laser scan La in the forward direction from a starting end s and performing the laser scan in a linear manner at a constant laser output P and a constant scanning speed Va until the laser beam reaches an inversion portion t (geometric end), that the scanning direction is then inverted at the inversion portion t and, at the same time, the laser scan Lb in the backward direction is performed at the laser output P as it is and at a high scanning speed Vb so as to allow the laser beam to overlap a part of the weld bead 11, and that the irradiation of the laser beam is terminated when the laser beam reaches a welding terminating end e.

As shown in FIG. 1(D), at the starting end s of the weld bead 11, the substantial welding length Wa starts from the point where the penetration formed by the laser irradiation from the above in the figure reaches the lower steel sheet 2. On the other hand, at the inversion portion t, since the scanning direction is inverted in the state where the penetration (keyhole) formed by the laser irradiation penetrates the lower steel sheet 2, and since molten metal flows into the inversion portion t (geometric end) located on the rear side in the advancing direction of the laser scan Lb in the backward direction which is performed after the inversion of the laser scan, the recessed portion shown in FIG. 1(D) and denoted by reference numeral 12 is buried (as will be described below), so that the substantial welding length Wa reaching a position very close to the geometric end (t) can be obtained.

The length of the laser scan Lb in the backward direction is not limited in particular, but the length of the laser scan Lb in the backward direction needs to be about four times or more of the width (Ba) of the weld bead 11, and is preferably five times or more of the width (Ba) of the weld bead 11. By the ratio of the length along the time axis T from the inversion portion t to the terminating end e in FIG. 1(C) with respect to the length from the inversion portion t to the terminating end e in FIG. 1(A), FIG. 1(B) and FIG. 1(D), it is shown that the time required for the section from the inversion portion t to the terminating end e is reduced in inverse proportion to the speed Vb.

Figure 3A:
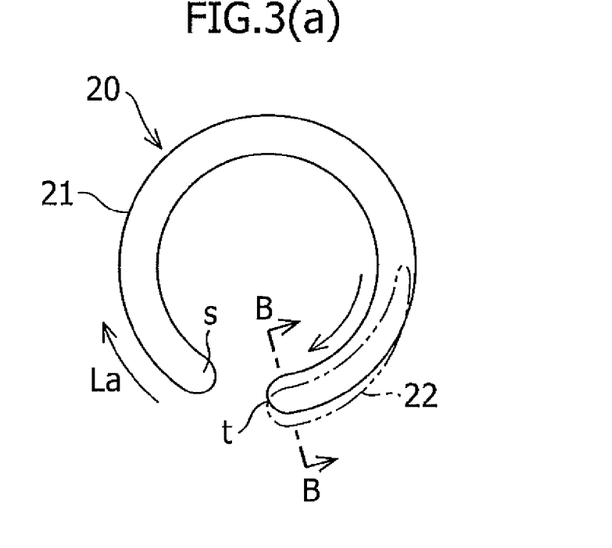
Figure 3B:
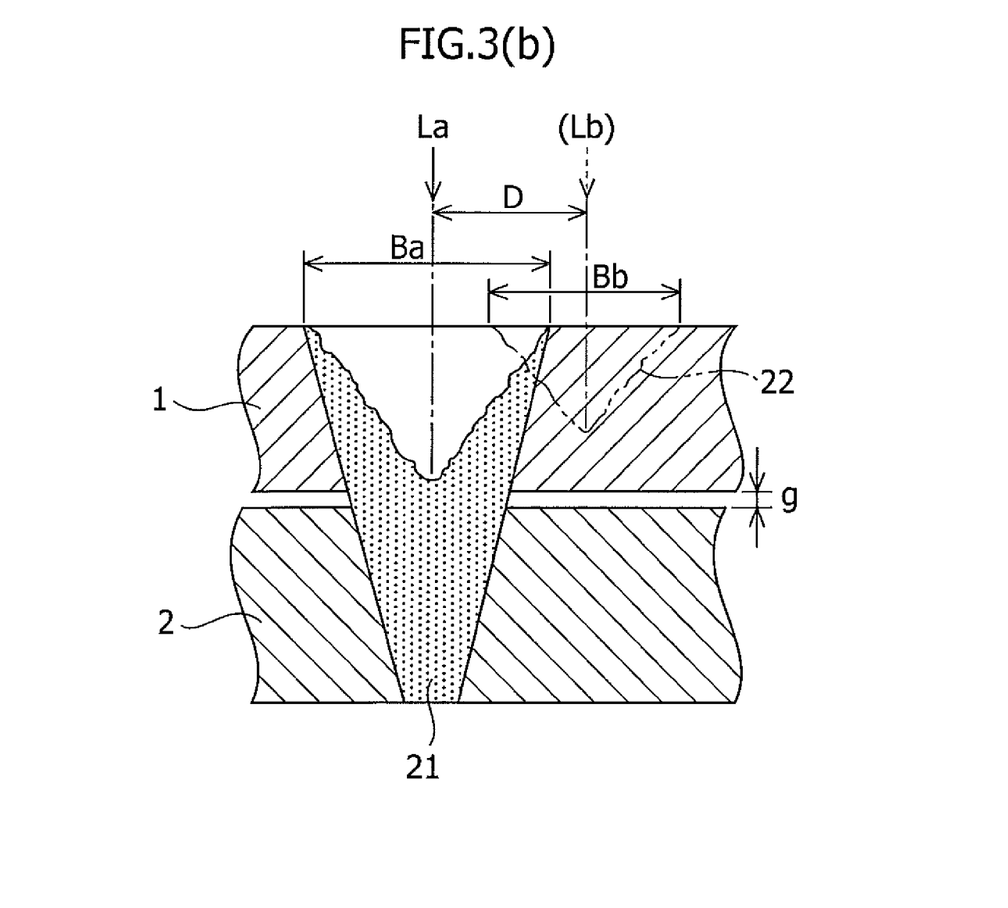
Figure 4A:
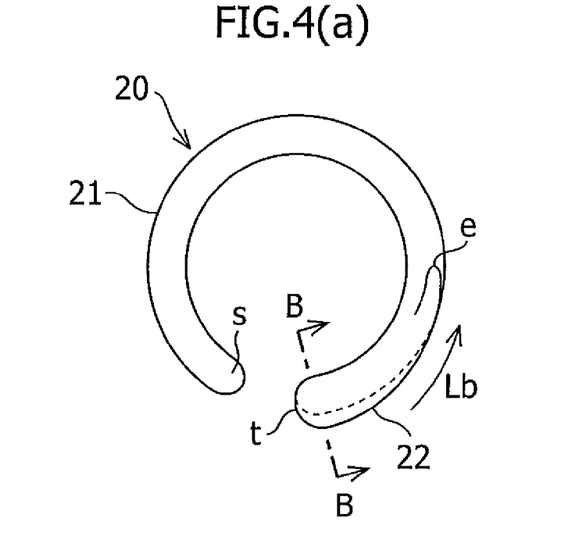

Furthermore, as is clear from the example described below, the permissible range of the scanning speed Vb in the backward direction with respect to the scanning speed Va (welding speed) in the forward direction relates to a shift between the laser scan La in the forward direction and the laser scan Lb in the backward direction, that is, an offset D (FIG. 3 and FIG. 4). When the offset D is set to an optimum value, the laser scan can be performed at a multiple speed ratio of Vb/Va=1, that is, a constant speed. However, in this case, the final bead width at the inversion portion t (geometric end) is slightly increased. When the multiple speed ratio Vb/Va is two or less, and when the offset D is small, the remelting rate of the metal of the molten portion is increased, so that a hole defect is not left in the inversion portion t (geometric end) but is left in the vicinity of the terminating end e of the laser irradiation.

As the multiple speed ratio Vb/Va is increased, the reducing effect of the laser output (power density) due to the increase in the scanning speed is exhibited, and the permissible range of the offset D is increased on the side of reducing the offset D. When the multiple speed ratio Vb/Va is set to two to three, the permissible range of offset D is maximized. When the multiple speed ratio Vb/Va is set to four or more, the power density becomes insufficient, and the permissible range of the offset D is reduced. However, the cycle time is reduced by the amount of time corresponding to the increase in the laser scanning speed.

Figure 2A:
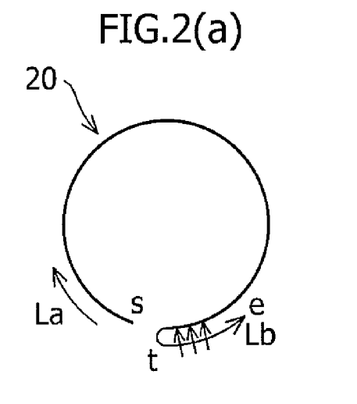
Figure 2B:
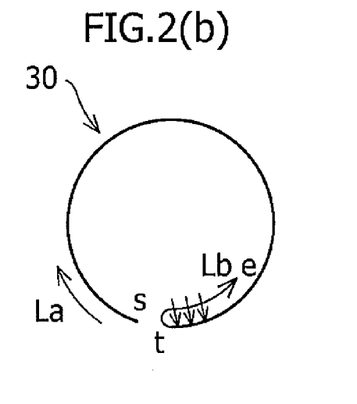

Next, FIG. 2(A) shows a laser scan in laser lap welding 20 according to a second embodiment of the present invention, and FIG. 2(B) shows a laser scan in laser lap welding 30 according to a third embodiment of the present invention. Any of the second and third embodiments shows an embodiment which forms a circular weld bead having an opened portion, and which is particularly suitable for laser welding (unit welding) as an alternative to spot welding in an automotive vehicle body welding process.

Among the second and third embodiments, in the laser lap welding 20 according to the second embodiment shown in FIG. 2(A), after the laser scan La in the forward direction is performed circularly from the starting end s to the inversion portion t (the geometric end of the weld bead), the scanning direction is reversed at the inversion portion t, and then the laser scan Lb in the backward direction is performed to the terminating end e by offsetting the laser beam to the outer side of the circular arc (on the outer side in the curvature direction). On the other hand, in the laser lap welding 30 according to the third embodiment shown in FIG. 2(B), the laser scan La in the forward direction is performed from starting end s to the inversion portion t similarly to the second embodiment, but the third embodiment is different in that the scanning direction is reversed at the inversion portion t, and then the laser scan Lb in the backward direction is performed to the terminating end e by offsetting the laser beam to the inner side of the circular arc (on the inner side in the curvature direction).

As described above, the gap g is formed between the two galvanized steel sheets 1 and 2 in order to discharge the zinc vapor generated at the time of welding the galvanized steel sheets 1 and 2. However, in the case of the weld beads 20 and 30 having a circular shape as in the second and third embodiments, when the welding is performed to reach the inversion portion t (the geometric end) and to again approach the starting end s, the inside of the weld beads 20 and 30 is in the state of communicating with the outside air only through the discontinuous portion between the starting end s and the inversion portion t. Thus, the weld bead 20 according to the second embodiment in which the scanning direction is reversed by offsetting the laser beam to the outer side of the circular arc is advantageous from the viewpoint of discharging the zinc vapor.

Figure 4B:
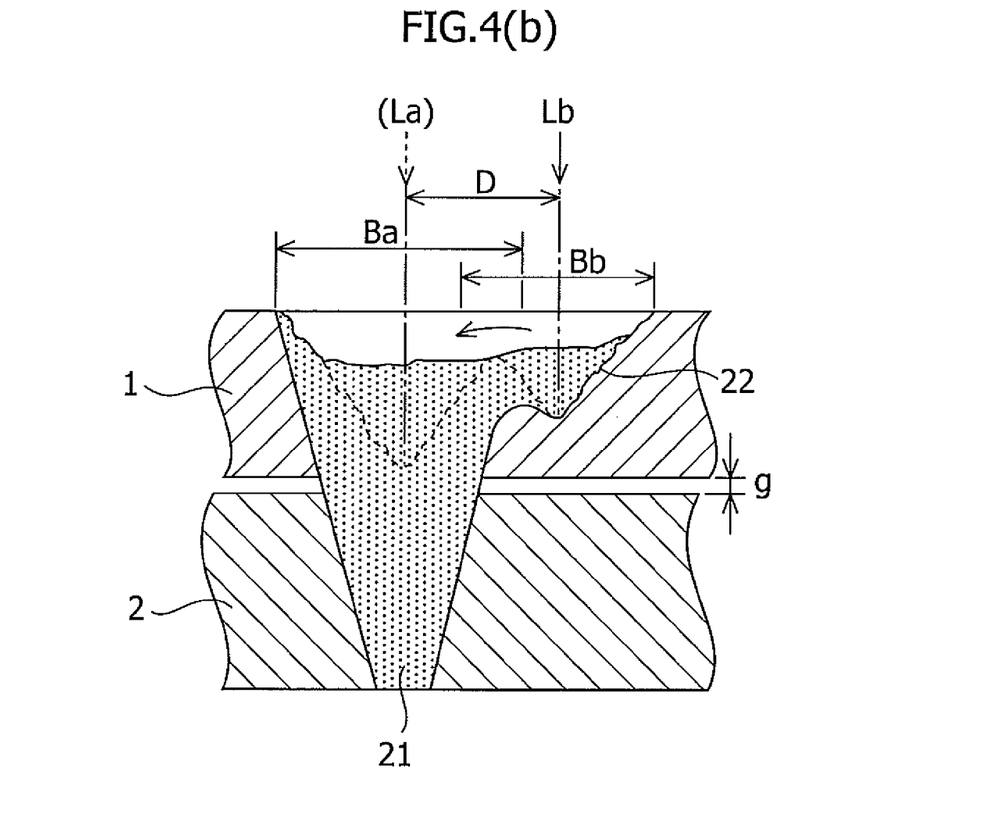

FIG. 3 shows a transitional bead shape in the laser lap welding 20 according to the second embodiment, and FIG. 4 shows a final bead shape. In the state where a weld bead 21 is formed from the starting end s to the inversion portion t by performing the laser scan La in the forward direction from the starting end s to the inversion portion t, a recessed portion (a portion of insufficient molten metal) corresponding to the thickness of the upper steel sheet 1 is caused momentarily as shown in FIG. 3(B). In this state, the scanning direction of the laser is reversed, and then the laser scan Lb in the backward direction is performed by offsetting the position of the laser beam from the position of the laser beam in the laser scan La in the forward direction. Thereby, a non-molten portion of the steel sheet 1 along the outer peripheral side of the weld bead 21 is melted and flows into the recessed portion of the weld bead 21, which portion is still in a molten state. As a result, the recessed portion is made to be shallow and flattened as shown in FIG. 4(B).

The laser scan Lb in the backward direction is performed at a high speed, similarly to the first embodiment. Thus, even when the laser output and the spot diameter in the laser scan Lb in the backward direction are the same as the laser output and the spot diameter in the laser scan La in the forward direction, the reducing effect of the laser output (power density) is obtained. Thereby, the bead width Bb in the laser scan Lb in the backward direction is made narrower than the bead width Ba in the laser scan La in the forward direction and, at the same time, the depth of the penetration is reduced to be less than the thickness of the upper steel sheet 1. When this state is reached, defects, such as an indentation, are not left even by terminating the laser scan Lb in the backward direction at the terminating end e.

EXAMPLES

In order to verify the effect of the laser lap welding method according to the present invention, experiments were performed in the laser lap welding 20 and 30 according to the second and third embodiments described above, and the quality of the weld bead was evaluated in each of the cases in which the offset D between the laser scan La in the forward direction and the laser scan Lb in the backward direction, and the scanning speed Vb of the laser scan Lb in the backward direction were changed.

In the experiments, an optical fiber laser oscillator (having a maximum output: 7 kW, the diameter of transmission fiber: 0.2 mm) manufactured by IPG photonics company, and a scanner head (processing focal diameter in the focused state: 0.6 mm) manufactured by HIGHYAG laser technology company were used. In each of the states where a non-plated steel sheet (1) having a thickness of 0.65 mm was overlapped on a galvanized steel sheet (2) having a thickness of 0.8 mm with gaps g=0.1 and 0.2 mm so as to be used as workpieces (a part of the experiments were performed in the case of the gap of 0.05 mm), when the circular laser scan La in the forward direction was performed under the conditions of the laser output: 4.3 kW, the laser beam diameter: 7 mm, the length of the discontinuous portion: 1 mm, the set welding length: 21 mm, the scanning speed: Va=6.9 m/min (first half) to 7.2 m/min (second half), and when the laser scan Lb in the backward direction was performed over one fourth (6.3 mm) of the circumference length in such a manner that the laser beam was offset to the outer peripheral side, that the scanning speed was changed from Vb=7.2 m/min (constant speed) to 35 m/min (4.8-fold speed, partially Vb=75 m/min (10.4-fold speed), and that the offset D was changed between D=0.1 mm and D=1.2 mm in steps of 0.1 mm, the depth of indentation between the inversion portion t and the terminating end e of the weld bead was measured, and the appearance on each side of the front and back surfaces of the pair of steel sheets were observed. The results of the experiments are shown in Table 1.

TABLE 1

| | | Offset D (mm) | | | | | | | | | | | | |
|---|---|---|---|---|---|---|---|---|---|---|---|---|---|---|
| | | 0.0 | 0.1 | 0.2 | 0.3 | 0.4 | 0.5 | 0.6 | 0.7 | 0.8 | 0.9 | 1.0 | 1.1 | 1.2 |
| Scanning speed Vb (m/min) | 7.2 | | | | | | X | | X | ◎ | | | | |
| | 10 | | | | X | X | X | X | ◎ | ◎ | | | | |
| | 15 | | | Δ | Δ | ◎ | ◎ | ◎ | ◎ | ◎ | | | | |
| | 20 | X | Δ | ○ | ○ | ○ | ○ | ◎ | ◎ | ○ | ◎ | ◎ | ◎ | ◎ |
| | 25 | | | ○ | ○ | ◎ | ○ | ○ | ◎ | ◎ | | ◎ | | |
| | 30 | | | ○ | ○ | ○ | ○ | ◎ | ◎ | ◎ | | | | |
| | 35 | | | ○ | ○ | ◎ | ◎ | ◎ | ◎ | | | | | |
| | 40 | | Δ | | | | ○ | | ◎ | | | | | |
| | 45 | | | | | | | | ◎ | | | | | |
| | 50 | | | | | | ○ | | ◎ | | | | | |

In Table 1, the case in which the indentation depth was less than 0.4 mm is represented by a "double circle", the case in which the indentation depth was 0.4 mm or more and less than 0.5 mm is represented by a "circle", the case in which the indentation depth was 0.5 mm or more and less than 0.65 is represented by a "triangle", and the case in which the indentation depth was 0.65 mm or more, or a hole penetrating the upper steel sheet 1 was confirmed is represented by a "cross".

As shown in Table 1, it was confirmed that, when the scanning speed Vb in the backward direction is set to a value of two times or more (15 m/min or more) of the scanning speed Va (7.2 m/min) in the forward direction, welding can be performed with stable quality in a relatively wide range of offsets D (the shift between the laser scan La in the forward direction and the laser scan Lb in the backward direction), which range corresponds to 15 to 95% of the beat width Ba (about 1.2 mm).

Furthermore, it was confirmed that, in the case of the offset D=0.7 mm which corresponds to about 60% of the bead width Ba and which is close to an optimum value of the offset D, neither an indentation nor a hole defect is caused even when the scanning speed Vb in the backward direction is set to a high speed. Table 1 shows the results of experiments in which the scanning speed Vb is 50 m/min or less, but good results were obtained in the range of the scanning speed Vb of 75 m/min or less.

Furthermore, in the case in which the offset D was set to 0.8 mm, no indentation was caused even when the scanning speed Vb in the backward direction was equal to the scanning speed Va (welding speed) in the forward direction. However, in this case, the bead width at the bead end was slightly increased. Thus, it can be said that, when the scanning speed Vb in the backward direction is equal to or set to a lower multiple of the scanning speed Va in the forward direction, it is advantageous to use the laser output control together with the above-described laser scanning control.

The above-described experiments relate to the case in which the laser scan Lb in the backward direction was performed by offsetting the laser beam to the outer peripheral side from the circular laser scan La in the forward direction. However, when similar experiments were also performed in the case in which the laser scan Lb in the backward direction was performed by offsetting the laser beam to the inner peripheral side from the circular laser scan La in the forward direction, generally the same tendency was confirmed, although the suitable offset range was slightly reduced as compared with the case in which the laser scan Lb in the backward direction was performed by offsetting the laser beam to the outer peripheral side from the circular laser scan La in the forward direction. However, in the case in which the laser scan Lb in the backward direction was performed by offsetting the laser beam to the inner peripheral side from the circular laser scan La in the forward direction, so as to reduce the radius of the bead, the laser scan Lb in the backward direction was performed over three eighths of the circumference length (7 mm) so that approximately the same scanning distance could be obtained.

Differences in the experimental results between in the case of the offset to the inner peripheral side and in the case of the offset to the outer peripheral side were seen when the gap was small (0.1 mm and 0.05 mm) causing a blow hole, a burn-through, and the like. This is considered to be due to the fact that, when the gap between the steel sheets is small, and when the laser scan Lb in the backward direction is performed on the inner peripheral side of the circular bead, the discharge property of the metallic vapor is deteriorated. However, in the case of the smallest gap g of 0.05 mm, no burn-through was caused, and generally better results were obtained as compared with the results in the case of the gap g of 0.1 mm. This is considered to be due to the fact that, when the gap g is smaller, the amount of molten metal entering into the gap g is smaller. It is, of course, considered that, when non-plating steel sheets, between which the gap g need not be provided, are used, the ranges of the suitable offsets D and of the scanning speed Lb can be further increased.

In the above, some embodiments according to the present invention have been described, but the present invention is not limited to the above described embodiments, and various modifications and changes can be made on the basis of the technical concept of the present invention.

For example, the case in which two steel sheets are overlapped and laser-welded is shown in the above-described embodiments. However, the laser lap welding method according to the present invention can also be applied to the workpiece having the other form, and can also be applied to the case in which three or more steel sheets are overlapped and laser-welded. Furthermore, the cases in which the weld bead has a linear shape and a circular shape (circular arc shape) are shown in the above-described embodiments, but the laser lap welding method according to the present invention can be applied to any shape of the weld beam other than these shapes of the weld bead.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A laser lap welding method by irradiating a laser beam from one side of a plurality of overlapped workpieces, comprising the steps of:
   scanning the laser beam in a forward direction along a predetermined section of the workpieces;
   reversing the scanning direction of the laser beam at a terminating end of the predetermined section;
   briefly scanning the laser beam in a backward direction, wherein the scanning the laser beam in the backward direction is offset from the scanning of the laser beam in the forward direction such that a part of weld bead formed by the laser scanning in the backward direction overlaps in a width direction the weld bead formed by the laser scan in the forward direction and wherein scanning the laser beam in the forward direction and scanning the laser beam in the backward direction are offset by a first distance, the first distance being less than a width of the weld bead; and
   terminating the irradiating of the laser beam onto the predetermined section.

2. The laser lap welding method according to claim 1, wherein scanning the laser beam in the backward direction is performed at a higher speed than scanning the laser beam in the forward direction.

3. The laser lap welding method according to claim 1, wherein scanning of the laser beam in the backward direction comprises reducing a laser output continuously or stepwise just before terminating the irradiating of the laser beam.

4. The laser lap welding method according to claim 1, wherein scanning of the laser beam in the forward direction comprises a curve-shaped laser scanning at least at the terminating end of the predetermined section, and wherein scanning of the laser beam in the backward direction is offset to the outer side in the curvature direction of the curve-shaped laser scanning.

5. The laser lap welding method according to claim 1, wherein scanning the laser beam in the forward direction comprises a curve-shaped laser scanning at least at the terminating end of the predetermined section, and wherein scanning the laser beam in the backward direction is offset to the inner side in the curvature direction of the curve-shaped laser scanning.

6. The laser lap welding method according to claim 1, wherein scanning the laser beam in the forward direction and scanning the laser beam in the backward direction results in two substantially parallel scans.

7. The laser lap welding method according to claim 1, wherein scanning the laser beam in the forward direction and scanning the laser beam in the backward direction does not result in scanning the same location more than once.

8. The laser lap welding method according to claim 1, wherein scanning the laser beam in the forward direction and scanning the laser beam in the backward direction causes molten metal to flow to a side of a geometric end of the weld bead.

* * * * *